United States Patent
Edsall et al.

(10) Patent No.: US 9,692,857 B2
(45) Date of Patent: *Jun. 27, 2017

(54) LOW LATENCY NETWORKING DEVICE USING HEADER PREDICTION

(71) Applicant: Cisco Technology, Inc., San Jose, CA (US)

(72) Inventors: Thomas J. Edsall, Los Gatos, CA (US); Putu Harry Subagio, Cupertino, CA (US); Alessandro Fulli, San Jose, CA (US); Christopher A. Wildman, Alamo, CA (US); Mingzhe Li, Fremont, CA (US); Wei-Jen Huang, Burlingame, CA (US); Chih-Tsung Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 14/702,270

(22) Filed: May 1, 2015

(65) Prior Publication Data
US 2015/0237177 A1    Aug. 20, 2015

Related U.S. Application Data

(63) Continuation of application No. 13/767,180, filed on Feb. 14, 2013, now Pat. No. 9,065,780.
(Continued)

(51) Int. Cl.
*H04L 12/28*     (2006.01)
*H04L 29/06*     (2006.01)
*H04L 12/801*    (2013.01)

(52) U.S. Cl.
CPC .............. *H04L 69/22* (2013.01); *H04L 47/12* (2013.01)

(58) Field of Classification Search
CPC combination set(s) only.
See application file for complete search history.

(56) References Cited

U.S. PATENT DOCUMENTS 5,056,058 A    10/1991   Hirata et al.
5,678,060 A * 10/1997   Yokoyama .......... H04L 12/5601
                                                                 709/212
(Continued)

FOREIGN PATENT DOCUMENTS

| | | |
|---|---|---|
| CN | 101971594 A | 2/2011 |
| EP | 2262186 A1 | 12/2010 |
| WO | 0111834 A1 | 2/2001 |

OTHER PUBLICATIONS

International Search Report and Written Opinion in International Application No. PCT/US2013/059344, mailed Dec. 11, 2013, 10 pages.

(Continued)

*Primary Examiner* — Frank Duong
(74) *Attorney, Agent, or Firm* — Edell, Shapiro & Finnan, LLC

(57) ABSTRACT

A network device receives a packet that includes a plurality of header fields. The packet is parsed to sequentially obtain the plurality of header fields. One or more header fields not yet available at the network device are predicted based on one or more header fields that are available at the network device. A network processing decision is generated for the packet based on the predicted one or more header fields and the one or more header fields that are available at the network device.

17 Claims, 7 Drawing Sheets

Related U.S. Application Data

(60) Provisional application No. 61/702,312, filed on Sep. 18, 2012.

(56) References Cited

U.S. PATENT DOCUMENTS

| | | | |
|---|---|---|---|
| 6,819,681 B1 | 11/2004 | Hariharasubrahmanian |
| 6,892,237 B1 | 5/2005 | Gai et al. |
| 6,961,777 B1 | 11/2005 | Hariharasubrahmanian |
| 7,106,731 B1 | 9/2006 | Lin et al. |
| 7,395,332 B2 | 7/2008 | Gai et al. |
| 7,474,666 B2 | 1/2009 | Kloth et al. |
| 7,656,818 B1 | 2/2010 | Baroudi et al. |
| 7,830,793 B2 | 11/2010 | Gai et al. |
| 7,899,048 B1 | 3/2011 | Walker et al. |
| 7,961,621 B2 | 6/2011 | Bergamasco et al. |
| 7,969,971 B2 | 6/2011 | Gai et al. |
| 8,208,389 B2 | 6/2012 | Alaria et al. |
| 8,640,036 B2 | 1/2014 | Pignataro et al. |
| 2005/0271073 A1 | 12/2005 | Johnsen et al. |
| 2009/0238184 A1 | 9/2009 | Darnell et al. |
| 2010/0158009 A1 | 6/2010 | Lee et al. |
| 2010/0316052 A1 | 12/2010 | Petersen |
| 2012/0177046 A1 | 7/2012 | Yamada et al. |
| 2014/0079062 A1 | 3/2014 | Edsall et al. |

OTHER PUBLICATIONS

International Search Report and Written Opinion in counterpart International Application No. PCT/US2013/059346, mailed Dec. 11, 2013, 8 pages.

Cisco Systems, Inc., "Cisco Nexus 3000 Series NX-OS Release Notes, Release 5.0(3)Us(1)," Aug. 31, 2011, pp. 1-12.

English Translation of First Office Action in counterpart Chinese Application No. 201380048257.8, issued Nov. 28, 2016, 9 pages.

* cited by examiner

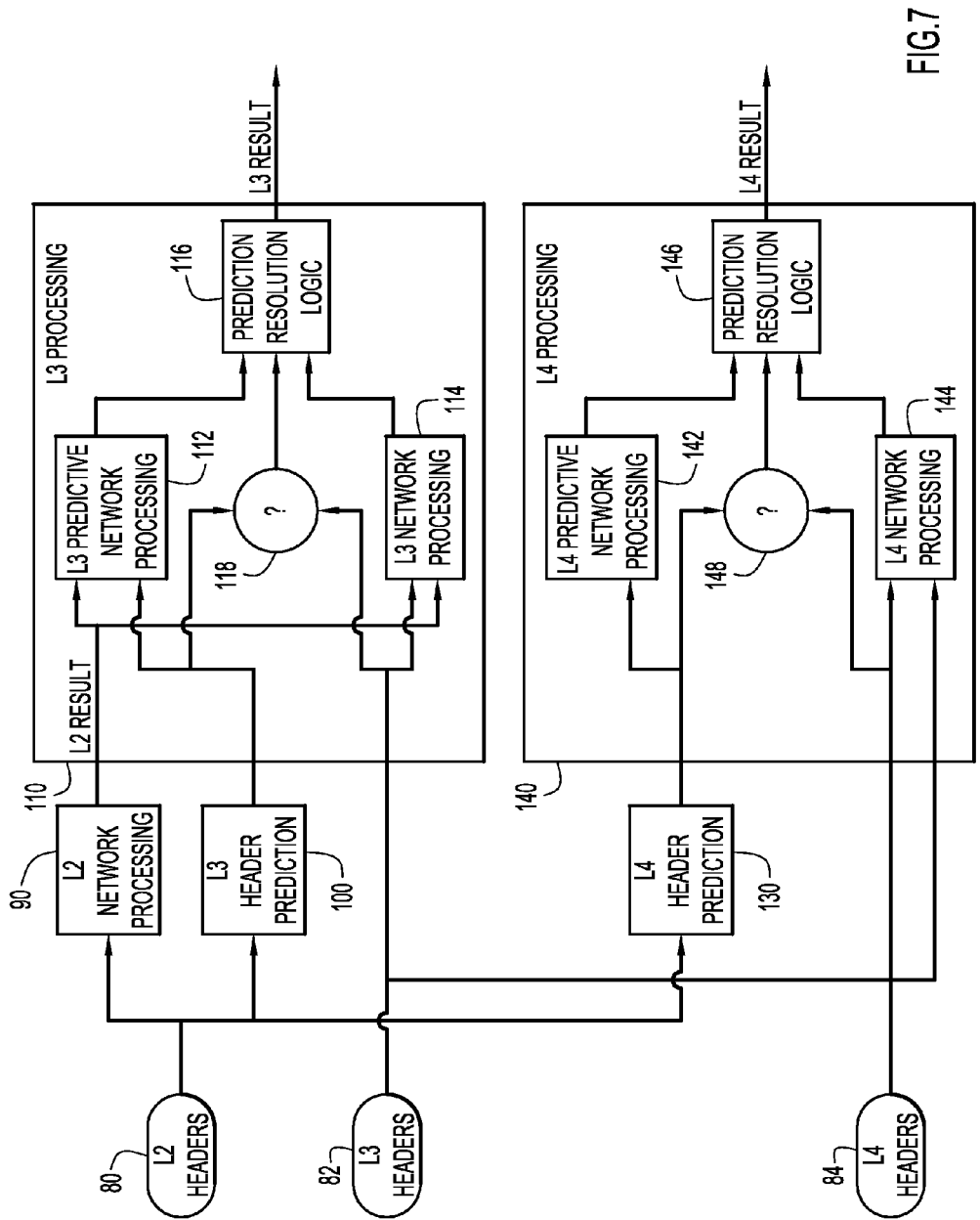

LOW LATENCY NETWORKING DEVICE USING HEADER PREDICTION

RELATED APPLICATIONS

This application is as continuation of U.S. Non-Provisional application Ser. No. 13/767,180, filed Feb. 14, 2013, which claims priority to U.S. Provisional Application No. 61/702,312, filed Sep. 18, 2012, entitled "Scalable Low Latency Multi-Protocol Networking Device", the contents of which are each incorporated in their entirety herein by reference.

TECHNICAL FIELD

The present disclosure relates generally to reducing latency in a networking device.

BACKGROUND

Packet header arrival delay and processing time contribute significant latency when making forwarding decisions in high speed network devices, such as switches. Network processing decisions use as input some subset of the bits of a packet header. Because the bits of a packet header do not arrive at the same time, traditional switch design methods delay network processing decisions until all the required bits arrive.

BRIEF DESCRIPTION OF THE DRAWINGS

FIG. 7 is a block diagram illustrating a multistage parallel configuration of the predictive process unit.

DESCRIPTION OF EXAMPLE EMBODIMENTS

Overview

A network device receives a packet that includes a plurality of header fields. The packet is parsed to sequentially obtain the plurality of header fields. One or more header fields not yet available at the network device are predicted based on one or more header fields that are available at the network device. A network processing decision is generated for the packet based on the predicted one or more header fields and the one or more header fields that are available at the network device.

Example Embodiments

Presented herein are predictive packet header techniques and a multistage networking decision pipeline to reduce the processing time of packets in low latency network devices e.g., switches. Predictive packet header processing can use hysteresis, network aware software, or other methods to provide narrow and accurate packet header prediction.

Figure 1:
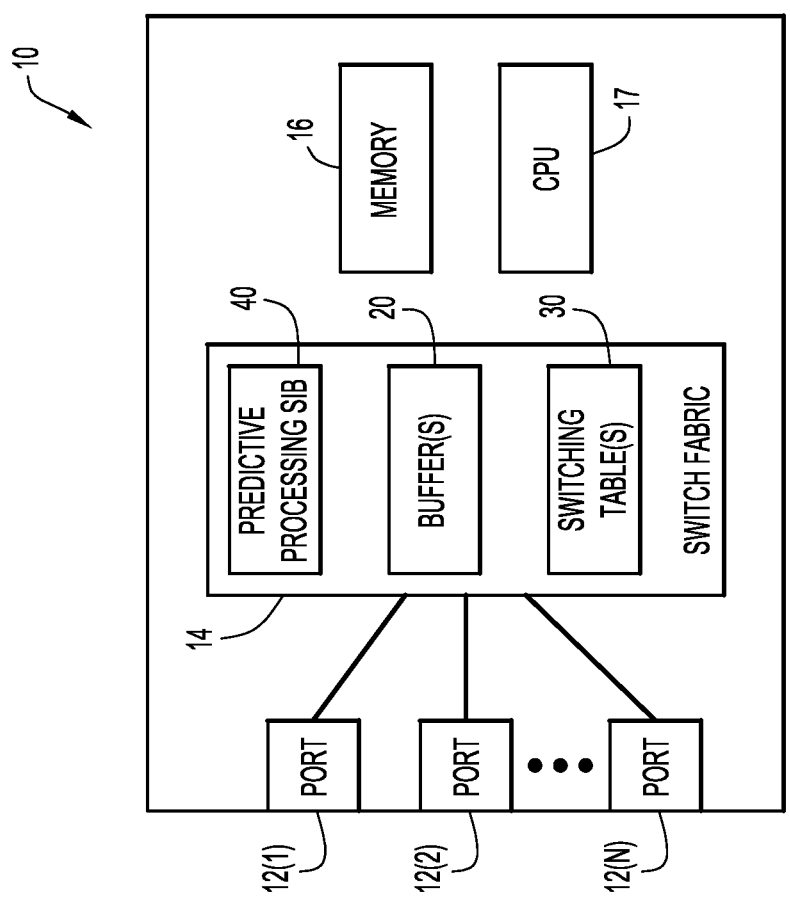
FIG. 1 is a block diagram of an example network device in which the predictive processing techniques presented herein may be performed.

FIG. 1 is a block diagram of an example network device 10 configured to perform the predictive packet header techniques and a multistage networking decision pipeline techniques. The network device 10 includes a plurality of ports 12(1)-12(N) configured to receive packets from a network and to send packets to the network, a switch fabric 14 for switching packets among ports 12(1)-12(N), a memory 16 and a central processing unit (CPU) 17. The switch fabric 14 includes one or more buffer(s) 20, switching table(s) 30 and a packet decision unit 40, i.e., a predictive processing switching information base (SIB). The CPU 17 performs higher level control of the operations of the network device 10. The buffer(s) 20 temporarily stores packets within the network device 10, as packets are being processed.

The predictive processing SIB 40 makes decisions including, but not limited to security, quality of service (QoS), statistics, ingress and egress access control policies, classification, marking, adding or deletion of packet fields, load balancing, multi-tenancy handling, Layer 2 bridging (switching) and Layer 3 routing, and dropping of packets. The switch fabric 14 may be implemented in digital logic gates in one or more application specific integrated circuits (ASICs).

Memory 16 may comprise read only memory (ROM), random access memory (RAM), magnetic disk storage media devices, optical storage media devices, flash memory devices, electrical, optical, or other physical/tangible memory storage devices. The CPU 17 is, for example, a microprocessor or microcontroller. Thus, in general, the memory 16 may comprise one or more tangible (non-transitory) computer readable storage media (e.g., a memory device) encoded with software comprising computer executable instructions and when the software is executed (by the CPU 17) it is operable to perform the techniques described herein. For example, the operations of the predictive processing SIB 40 may be partially or completely performed in software stored in memory 16 and is executed by the CPU 17.

The network device 10 can be any network device now known or hereinafter developed, including a switch, router, gateway, a software stack on a host device, a virtual network interface card (VNIC), virtual switches, and a physical network interface card (including those that support virtualization).

Figure 2:
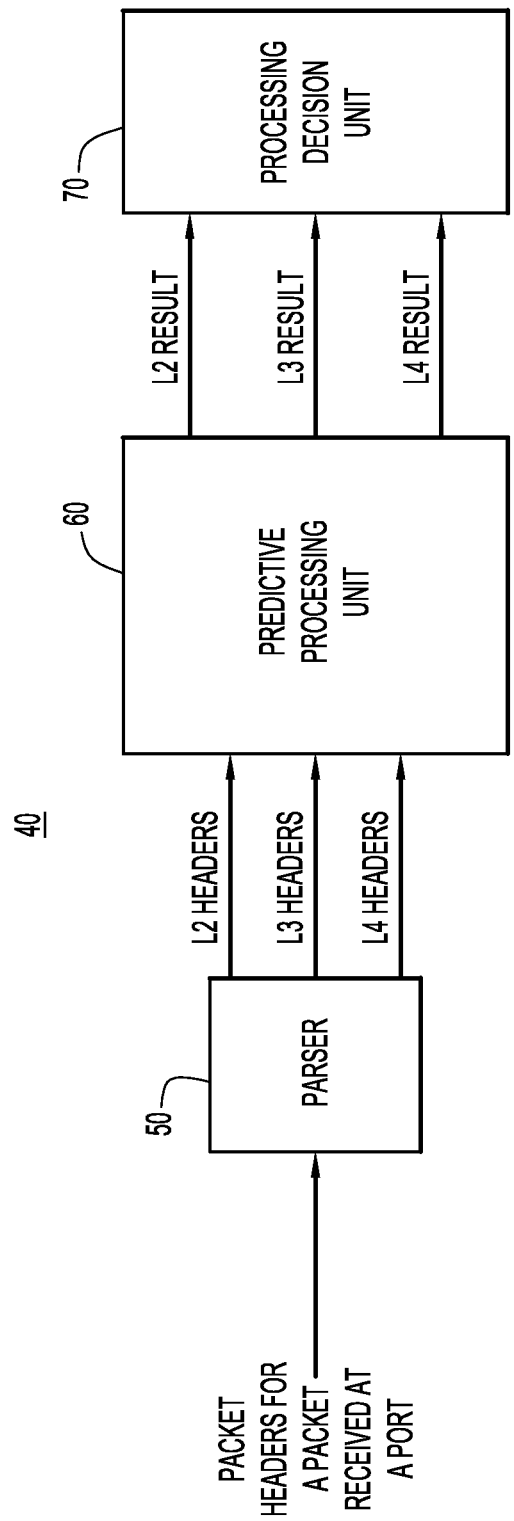
FIG. 2 is a high level block diagram of the components in the network device configured to perform the predictive processing techniques.

Turning now to FIG. 2, a high level block diagram is shown for the predictive processing SIB 40 according to one example. The predictive processing SIB 40 includes a parser 50, a predictive processing unit 60 and a processing decision unit 70. The parser 50 comprises digital logic configured to parse fields of a received packet as the bits of the packet are received at a port of the network device. For example, the parser 50 is configured to parse each of a plurality of header fields (also simply referred to herein as "headers") of a packet and to supply the headers to the predictive processing unit 60 as they are received. A packet sent over a network typically has a plurality of sets of headers including a set of Layer 2 (L2) header fields, a set of Layer 3 (L3) header fields and a set of Layer 4 (L4) header fields, as shown in FIG. 2. The data for these sets of header fields are parsed sequentially as they are received at a port of the network device. Thus, a first set of header fields, e.g., the L2 headers, is available, followed by a second set of header fields (e.g., the L3 headers), followed by a third set of header fields (e.g., the L4 headers). There may be a parser 50 for each port of the network device, but for simplicity only a single parser is shown in FIG. 2.

The predictive processing unit 60 receives the plurality of sets of headers (header fields) and generates a network processing decision result for each of the sets of headers. For example, the predictive processing unit 60 generates for a packet a L2 network processing decision result, a L3 network processing decision result and a L4 network processing decision result. The network processing decision results for a packet are supplied to the processing decision unit 70, and the processing decision unit 70 makes a network processing decision for the packet based on one or more of the network processing decision results. In some cases, the processing decision unit 70 can make a processing decision for a packet based solely on the L2 network processing decision result, or based on the L2 and L3 network processing decision results, or based on the L2, L3 and L4 network processing decision results. The operations of the processing decision unit 70 may be integrated into the predictive processing unit 60, as will appreciated by the example configurations shown in FIGS. 3, 6 and 7, described hereinafter.

Each of the L2, L3 and L4 headers comprises a plurality of fields. For example, for an Ethernet frame/packet, the fields of the L2 headers include a source media access control (MAC) address field, a destination MAC address field, an EtherType protocol identifier field and an optional IEEE 802.1Q tag field. Examples of fields of the L3 headers include Internet Protocol (IP) source address and IP destination address fields. Examples of fields of the L4 headers include a Transmission Control Protocol (TCP) or Universal Datagram Protocol (UDP) source port field, TCP or UDP destination port field, sequence number field and acknowledgment number field.

The techniques presented herein are applicable to perform prediction for an arbitrarily deep number of header fields, and beyond L4 headers, for example, such as Deep Packet Inspection (DPI) header fields. While the figures and description herein refer to L2, L3, and L4 headers, this is meant by way of example only. It is to be appreciated that these techniques are generally applicable to predicting one or more header fields not yet available at the network device based on one or more header fields that are available at the network device. A network processing decision is generated for the packet based on the predicted one or more header fields and the one or more header fields that are available at the network device.

Figure 3:
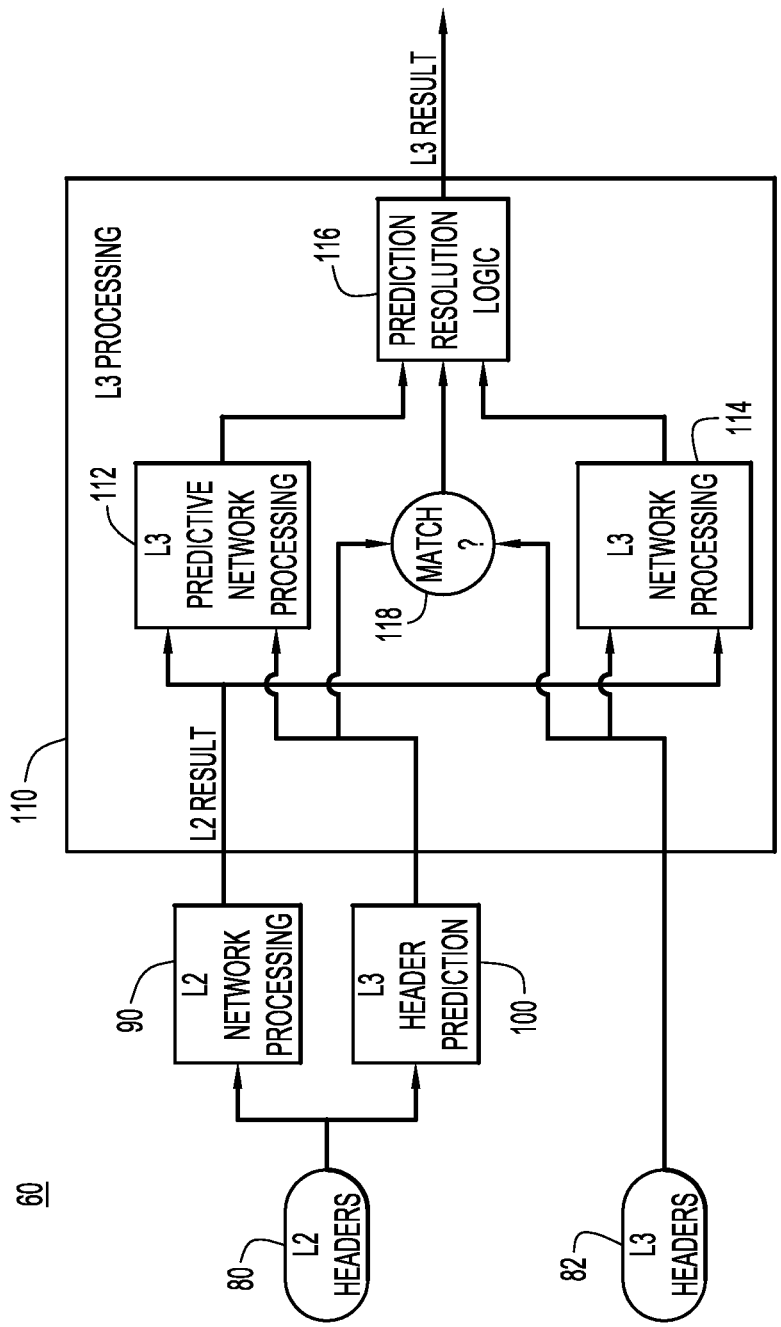
FIG. 3 is a block diagram of a predictive processing unit capable of a low latency fast path network processing decision according to one example.

Turning now to FIG. 3, a block diagram is shown for one form of the predictive processing unit 60 for a simple case involving a first set of header fields, e.g., L2 headers and a second set of header fields, e.g., L3 headers. The L2 headers are represented at reference numeral 80 and the L3 headers are represented at reference numeral 82. As explained above, the L2 headers will be available and ready (by the parser 50 shown in FIG. 2) for processing a period of time before the L3 headers are available for processing.

The predictive processing unit 60 includes a L2 network processing unit 90, a L3 header prediction unit 100 and a L3 processing block 110. The L3 processing block 110 includes a L3 predictive network processing unit 112, a L3 network processing unit 114, a prediction resolution logic unit 116 and a comparator 118. The L2 headers are supplied as input to both the L2 network processing unit 90 and the L3 header prediction unit 100. The L2 network processing unit 90 is configured to generate a L2 network processing decision result (L2 result) based on the L2 headers 80. The L2 result is supplied as input to the L3 predictive network processing unit 112 and to the L3 network processing unit 114.

The L3 header prediction unit 100 is configured to predict the L3 headers based on the L2 headers, before the L3 headers 82 have been parsed and are available for processing at the network device. Thus, the L3 header prediction unit 100 will output a prediction of the L3 headers (predicted second set of header fields) for a packet based on the received L2 headers (received first set of header fields) of that packet.

The L3 predictive network processing unit 112 is configured to generate a predicted L3 network processing decision based on the L2 result and the predicted L3 headers. The L3 network processing unit 114 generates an actual L3 network processing decision based on the L2 result and the L3 headers, after all the L3 headers are parsed and available for processing at the network device. Consequently, the L3 predictive network processing unit 112 will output a predictive L3 network processing decision before the L3 network processing unit 114 will output an actual L3 network processing decision. Moreover, the L3 network processing unit 114 cannot even begin to operate until it receives all the L3 headers.

The comparator 118 compares the predicted L3 headers generated by the L3 header prediction unit 100 with the received L3 headers 82 once all the L3 headers are available for processing. If the comparator 118 finds a match between the predicted L3 headers and the received L3 headers, it generates an output supplied to the prediction resolution logic unit 116.

The prediction resolution logic unit 116 resolves which network processing decision should be used, the predicted decision output by the L3 predictive network processing unit 112 or the actual decision from the L3 network processing unit 114. If the prediction is correct, that is, if the L3 predicted headers match the received L3 headers 82, then the prediction resolution logic 116 will, based on the output from the comparator 118, select the L3 predicted network processing decision for use as the L3 network processing decision result (L3 result). Otherwise, the prediction resolution logic 116 will wait for the actual L3 network processing decision output by the L3 network processing unit 114 based on the received L3 headers for use as the L3 result.

Other factors like reordering and packet priority are an important piece of the prediction resolution logic. In some cases the prediction result may be discarded to prevent packet reordering or to prevent preemption by lower priority packets. For these situations, the network device may wait for completion of the generation of network processing decision based on the received packet headers regardless of the comparison result between the predicted packet headers and the received packet headers.

Conversely, there are also certain situations in which the prediction result can always be used. An example is a static video streaming network in which the probability of incorrectly predicting headers is low and the loss of a low number of packets is negligible. For these situations, the network device will always select the predicted network processing decisions for packets of a packet flow type known to have a low probability of incorrectly predicting header fields, e.g., predicting the second set of header fields based on the first set of header fields.

Header prediction logic used by the L3 header prediction unit 100 can be implemented in several ways. With reference now to FIG. 4A, one example method for L3 header prediction is to cache the headers of recent packets. FIG. 4A shows an example cache 120 containing a table of L2 headers and L3 headers of packets received by the network device over time. In this example, the "key" to the cache is the L2 headers and the stored/cached value is its L3 headers. When a new packet arrives, its L2 headers information is looked up in the cache to obtain a prediction for the L3 headers in significantly less time than it takes for the L3 headers to be fully parsed and made available for processing.

For example, as shown in FIG. 4A, a packet is received with L2 headers=(Source MAC1, Destination MAG3, EtherTypeX). The L2 headers are used as a key 122 to the cache 120 to search the cache 120 using those L2 headers in order to locate a match and to retrieve the corresponding L3 headers. The result retrieved 124 from the cache using the key 122 is (IP Source Address3, IP Destination Address4, . . . ).

FIG. 4B shows another example cache 120' for which a key 126 consists of L2 headers and L3 headers and the result 128 consists of L4 headers. The example in FIG. 4B shows a key 126 consisting of L2 headers (Source MAC2, Destination MAC4, EtherTypeX) and L3 headers (IP Source Address2, IP Destination Address3, . . . ) and a corresponding result consisting of L4 headers (TCP Source Port 1, TCP Destination Port 5, . . . . ). While FIG. 4B shows the key consisting of L2 and L3 headers for retrieving L4 headers, this is not meant to be limiting as in some cases, the key may be L2 headers alone.

Thus, FIGS. 4A and 4B shows that data may be stored in a cache for a first set of header fields and corresponding data for a second set of header fields (and optionally a third set of header fields) for packets received over time at the network device. The prediction then involves using the received first set of header fields (and second set of header fields) of a packet to look up and retrieve from the cache data for the corresponding second set of header fields (or corresponding third set of header fields), if there is an entry in the cache matching the first set (and second set) of header fields.

FIGS. 4A and 4B are examples of a temporal cache. Again, in FIG. 4A, L3 header prediction is involves caching the headers of recent packets. The key to the cache would be the packet's L2 headers and the value stored is its L3 headers. When a new packet arrives, its L2 information is looked up in the cache to obtain/retrieve a prediction for the L3 headers in significantly less time than it takes for the L3 headers to be fully parsed. Once the new packet's L3 headers are fully parsed the L3 headers are pushed into the cache if an entry does not already exist.

Other methods for packet header prediction may use buffer history, flow records, network aware software or even statistical calculations to make accurate packet header prediction.

A buffer history can be used for performing packet header prediction by tracking the occurrence of packets with specific headers. For example, when a new packet arrives, its L2 headers are used as a key to a buffer history cache that returns the L3 headers for packets with matching L2 headers that had the highest number of occurrences in the buffer history cache. Once the new packet's L3 headers are fully parsed, the L3 headers are pushed into the buffer history cache, increasing the occurrence number for the matching header record.

Packet flows are bursty packets which are likely to arrive in identical trains, often reproducing the same flow many times. It is useful to record the previous packet's headers to be used as a key to lookup and predict the headers for the current packet. For example, when packets arrive their headers are stored as a key to a flow history cache in which the result data is the next packet's headers. In the future, when the same packet arrives, its headers are used to lookup the prediction for the next packet's headers.

The prediction examples above use a cache populated in hardware by hardware. The prediction cache can also be populated by network aware software. Many protocols transfer information about the hosts and headers of packets that traverse a network device. This information can be used to populate a prediction cache and is especially useful in more static network configurations where the cache hit frequency and prediction accuracy become very high.

Figure 5:
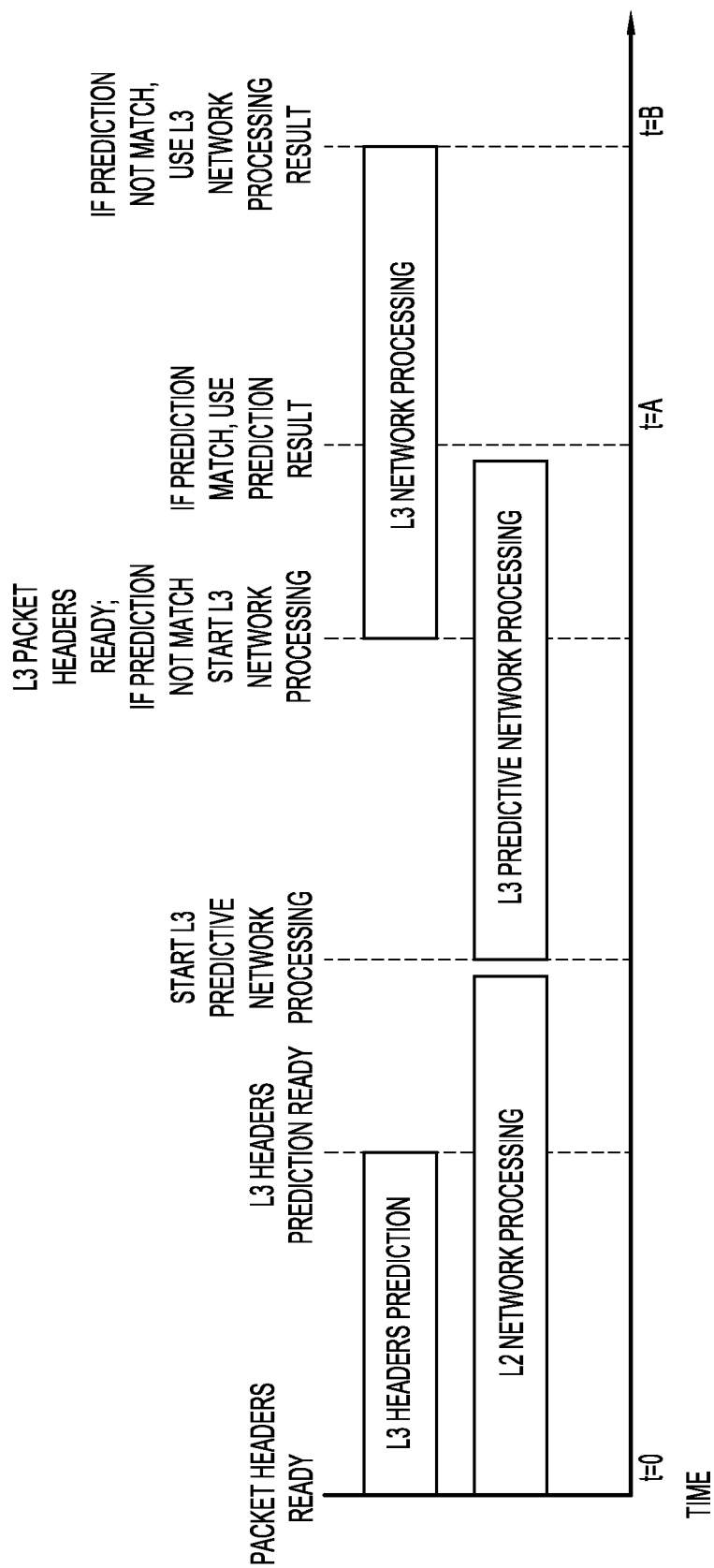
FIG. 5 is a timing diagram illustrating the latency improvement that can be achieved using the predictive processing unit shown in FIG. 3.

Turning now to FIG. 5, a diagram is shown that illustrates the timing savings that may be achieved using the predictive header processing techniques described above in connection with FIG. 3. This figure shows that the packet latency without using the predictive techniques to obtain L3 network processing results is at time t=B=time for L3 Packet Headers Ready plus time for L3 Network Processing. The packet latency with use of the predictive techniques is t=A=max(L3 Headers Prediction, L2 Network Processing) plus L3 Predictive Network Processing. L3 Predictive network processing requires both the L3 predicted headers and the L2 network processing results. The max( ) function is use to account for which takes longer, prediction of the L3 headers or L2 network processing. The latency savings is B−A=L3 Headers Ready+L3 Network Processing−(max(L3 Headers Prediction, L2 Network Processing)+L3 Predictive Network Processing). In the normal case, L3 Predictive Network processing will have the same latency as normal L3 network processing, and may even use the same hardware. In that case, the latency savings using predictive network processing is L3 Headers Ready−max(L3 Headers Prediction, L2 Network Processing).

Thus, to summarize, FIG. 3 illustrates an example of a low latency fast path processing decision configuration in which, based on a received first set of header fields made available at a network device, a predicted second set of header fields is generated before a received second set of header fields is made available at the network device. A network processing decision is generated based on the first set of header fields and the predicted second set of header fields before the received second set of header fields is made available at the network device.

The network processing decision may be generated by: generating a first network processing decision result based on the first set of header fields; generating a predicted second network processing decision based on the first network processing decision and the predicted second set of header fields; after the received second set of header fields is made available at the network device by the parsing, generating an actual second network processing decision based on the first network processing decision result and the received second set of header fields; and selecting for use as a second network processing decision result either the predicted second network processing decision or the actual second network processing decision.

Figure 4:
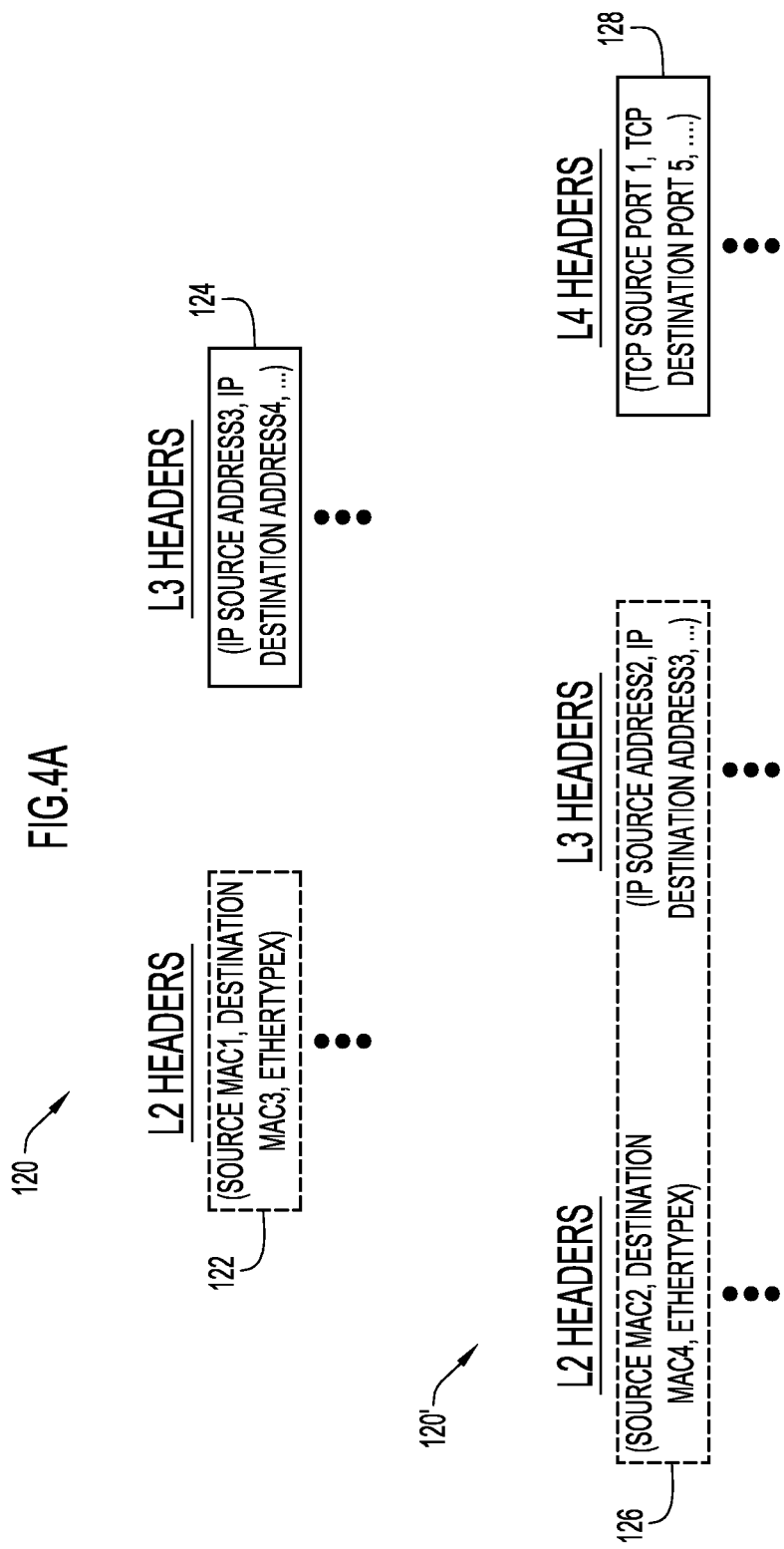
FIGS. 4A and 4B are diagrams illustrating examples of a cache used in the predictive processing unit for predicting a set of header fields not yet received from received header fields.
Figure 6:
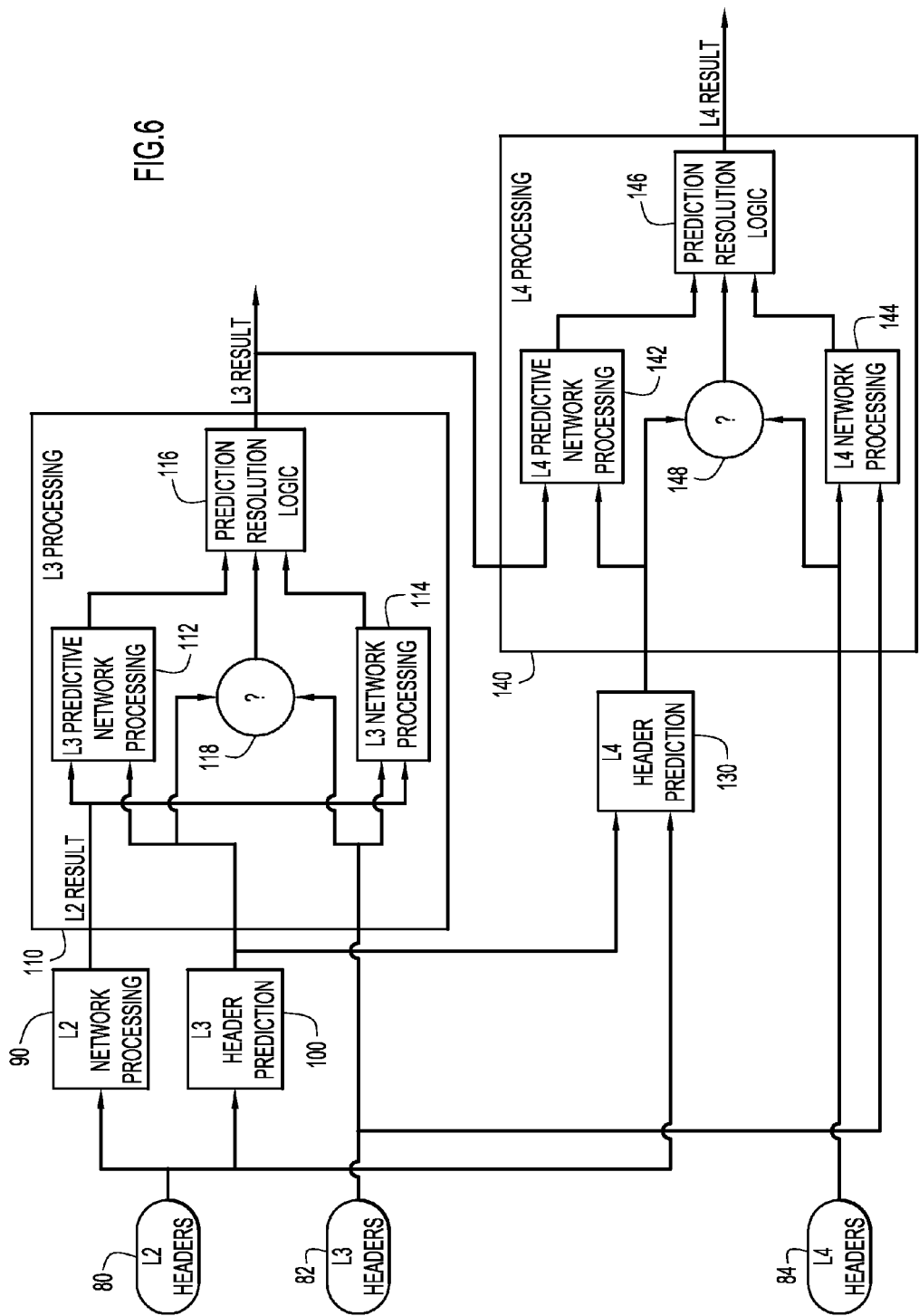
FIG. 6 is a block diagram illustrating a multistage cascaded configuration of the predictive process unit.

Reference is now made to FIGS. 6 and 7 for a generalization/extension of the techniques depicted in FIGS. 3-5 to multistage prediction. A network forwarding pipeline makes processing decisions on many different packet types of headers. To minimize the latency of the pipeline it is necessary to make packet header predictions for each of the different types of packet headers.

One method to provide multiple predictions, shown in FIG. 6, is to cascade the packet header logic so that the earliest packet headers prediction result is provided as a seed to the next packet headers prediction. This method provides higher accuracy of prediction for the later packet headers. FIG. 6 shows the same arrangement shown in FIG. 3, but with the addition of L4 headers shown at 84, L4 header prediction unit 130 and L4 processing block 140. L4 header prediction unit 140 receives as input the L2 headers 80 and the L3 predicted headers output by the L3 header prediction unit 100. The L4 processing unit 140 comprises L4 predictive network processing unit 142, L4 network processing unit 144, prediction resolution logic 146 and comparator 148.

The L4 processing block 140 operates in a similar manner as the L3 processing block 110. The inputs to the L4 predictive network processing unit 142 are the L3 result from L3 processing block 110 and the L4 predicted headers from L4 header prediction unit 130. The L4 predictive network processing unit generates a predicted L4 network processing decision that is supplied to the prediction resolution logic unit 146. The L4 network processing unit 144 operates on the L4 headers 84, once they are available, and the L3 headers. The L4 network processing unit 144 generates an actual L4 network processing decision supplied to the prediction resolution logic unit 146. The comparator 148 compares the L4 predicted headers with the received L4 headers. If there is a match, then an output is supplied to the prediction resolution logic unit 146 to select the predicted L4 network processing decision for use as the L4 result. Otherwise, the prediction resolution logic unit 146 waits for the actual L4 network processing decision output by the L4 network processing unit 144, and selects it for use as the L4 result.

Thus, in summary, FIG. 6 illustrates a process by which a third set of header fields is predicted based on a received first set of header fields and a predicted second set of header fields. A predicted third network processing decision is generated based on the predicted third set of header fields and a second network processing decision result. After a received third set of header fields is made available at the network device (by the parsing of the packet), an actual third network processing decision is generated based on the received second set of header fields and the received third set of header fields. Either the predicted third network processing decision or the actual third network processing decision is selected for use as a third network processing decision result.

An even lower latency method is to perform all of the packet header predictions in parallel, though at a cost of a less granular prediction. This parallelized method may still be useful in certain static network environments. Using packet header prediction, a multistage networking pipeline can be created in which a small number of network processing decisions are started in parallel before all the required packet headers have arrived or are otherwise made available. Each network processing decision may have one or more unique packet header predictions as an input seed. Once all of the necessary headers have arrived the correct network processing decision can be selected in almost zero time.

A configuration in which all packet header predictions are performed in parallel is shown in FIG. 7. The L3 block 110 in FIG. 7 is the same as in FIG. 6. However, in FIG. 7 unlike FIG. 6, L4 header prediction by the L4 header prediction unit 130 is based only on the L2 headers 80. In addition, the L4 processing block 140 does not use the L3 result. Instead, the L4 predictive network processing unit 142 uses only the L4 predicted headers as input. Thus, the L4 result output by L4 processing block 140 is derived solely from either the L4 predicted headers or the received L4 headers.

To summarize the parallel configuration of FIG. 7, a third set of header fields is predicted based on the first set of header fields, and thus before even the second set of header fields is available at the network device. A predicted third network processing decision is generated based on the predicted third set of header fields without waiting for the second network processing decision result. After a received third set of header fields is made available at the network device (by parsing of the packet), an actual third network processing decision is generated based on the received second set of header fields and the received third set of header fields. Either the predicted third network processing decision or the actual third network processing decision is selected for use as a third network processing decision result.

In summary, the techniques presented are generally applicable to predicting one or more header fields (e.g., L3, L4, DPI fields, etc.) not yet available at the network device based on any one or more header fields that are available at the network device. A network processing decision is generated for the packet based on the predicted one or more header fields and the one or more header fields that are available at the network device. The prediction may involve predicting using a received first set of header fields (e.g., L2 headers) to predict a second set of header fields (e.g., L3 headers), using a received first set of header fields (e.g., L2 headers) to predict a second and third set of header fields (e.g., L3 and L4 headers), using a received first set of header fields (e.g., L2 headers) and optional a second and/or third set of header fields to predict a fourth set of header fields (e.g., DPI headers), and so on. To generalize, header prediction may involve predicting one or more of: Layer 3 headers, Layer 4 headers, and Deep Packet Inspection headers, based on one or more of: received Layer 2 headers, received Layer 3 headers, predicted Layer 3 headers, received Layer 4 headers, and predicted Layer 4 headers.

The above description is intended by way of example only.

What is claimed is:

1. A method comprising:
   at a network device, receiving a packet that includes a plurality of sets of header fields;
   parsing the packet to sequentially obtain the plurality of sets of header fields;
   predicting, based on a received first set of header fields made available at the network device, a predicted second set of header fields before a received second set of header fields is made available at the network device; and
   generating a network processing decision for the packet based on the first set of header fields and the predicted second set of header fields before the received second set of header fields is made available at the network device, wherein generating the network processing decision comprises selecting for use as a second network processing decision result either a predicted second network processing decision that is based on the first set of header fields or an actual second network processing decision that is based on the network processing decision and the received second set of header fields.

2. The method of claim 1, further comprising storing in a cache data for a first set of header fields and corresponding data for a second set of header fields for packets received over time at the network device; and wherein predicting comprises using the received first set of header fields of a packet to look up and retrieve from the cache data for the corresponding second set of header fields.

3. The method of claim 1, further comprising comparing the predicted second set of header fields with the received second set of header fields.

4. The method of claim 3, wherein selecting comprises selecting the predicted second network processing decision when it is determined based on the comparing that the predicted second set of header fields match the received second set of header fields, and otherwise waiting for completion of the generating of the actual second network processing decision.

5. The method of claim 3, wherein selecting comprises selecting the actual second network processing decision and waiting for completion of the generating of the second network processing decision regardless of results of the comparing.

6. The method of claim 3, wherein selecting comprises always selecting the predicted second network processing decision for packets of a packet flow known type to have a low probability of incorrectly predicting the second set of header fields.

7. The method of claim 1, further comprising:
predicting a third set of header fields based on the first set header of fields and the predicted second set of header fields;
generating a predicted third network processing decision based on the predicted third set of header fields and the second network processing decision result;
after a received third set of header fields is made available at the network device by the parsing, generating an actual third network processing decision based on the received second set of header fields and the received third set of header fields; and
selecting for use as a third network processing decision result either the predicted third network processing decision or the actual third network processing decision.

8. The method of claim 1, further comprising:
predicting a third set of header fields based on the first set of header fields;
generating a predicted third network processing decision based on the predicted third set of header fields;
after a received third set of header fields is made available at the network device by the parsing, generating an actual third network processing decision based on the received second set of header fields and the received third set of header fields; and
selecting for use as a third network processing decision result either the predicted third network processing decision or the actual third network processing decision.

9. The method of claim 1, wherein predicting comprises predicting one or more of: Layer 3 headers, Layer 4 headers, and Deep Packet Inspection headers, based on one or more of: received Layer 2 headers, received Layer 3 headers, predicted Layer 3 headers, received Layer 4 headers, and predicted Layer 4 headers.

10. An apparatus comprising:
at least one port configured to receive packets from a network and to output packets to the network, each of the packets including a plurality of sets of header fields;
a parser configured to parse the packet to sequentially obtain the plurality of sets of header fields;
a packet decision unit coupled to the parser, and configured to:
predict, based on a received first set of header fields made available at the network device, a predicted second set of header fields before a received second set of header fields is made available at the network device; and
generate a network processing decision for the packet based on the first set of header fields and the predicted second set of header fields before the received second set of header fields is made available at the network device; and
select for use as a second network processing decision result either a predicted second network processing decision that is based on the first set of header fields or an actual second network processing decision that is based on the network processing decision and the received second set of header fields.

11. The apparatus of claim 10, wherein the packet decision unit is further configured to generate the network processing decision by:
predicting a third set of header fields based on the first set header of fields and the predicted second set of header fields;
generating a predicted third network processing decision based on the predicted third set of header fields and the second network processing decision result;
after a received third set of header fields is made available at the network device by the parsing, generating an actual third network processing decision based on the received second set of header fields and the received third set of header fields; and
selecting for use as a third network processing decision result either the predicted third network processing decision or the actual third network processing decision.

12. The apparatus of claim 10, wherein the packet decision unit is configured to predict one or more of: Layer 3 headers, Layer 4 headers, and Deep Packet Inspection headers, based on one or more of: received Layer 2 headers, received Layer 3 headers, predicted Layer 3 headers, received Layer 4 headers, and predicted Layer 4 headers.

13. A non-transitory computer readable tangible storage media encoded with instructions that, when executed by the processor, cause the processor to:
receive a packet that includes a plurality of sets of header fields;
parse the packet to sequentially obtain the plurality of sets of header fields;
predict, based on a received first set of header fields made available at the network device, a predicted second set of header fields before a received second set of header fields is made available at the network device; and
generate a network processing decision for the packet based on the first set of header fields and the predicted second set of header fields before the received second set of header fields is made available at the network device; and
select for use as a second network processing decision result either a predicted second network processing decision that is based on the first set of header fields or an actual second network processing decision that is based on the network processing decision and the received second set of header fields.

14. The computer readable tangible storage media of claim 13, further comprising instructions that, when executed by the processor, cause the processor to:

predict a third set of header fields based on the first set header of fields and the predicted second set of header fields;

generate a predicted third network processing decision based on the predicted third set of header fields and the second network processing decision result;

after a received third set of header fields is made available at the network device by the parsing, generate an actual third network processing decision based on the received second set of header fields and the received third set of header fields; and select for use as a third network processing decision result either the predicted third network processing decision or the actual third network processing decision.

15. The computer readable tangible storage media of claim 13, wherein the instructions that, when executed by the processor, cause the processor to predict comprise instructions that cause the processor to:

store in a cache header fields of packets received over time; and predict one or more header fields by using as a key to the cache one or more received header fields to retrieve corresponding one or more other header fields not yet made available for a packet received by the network device.

16. The computer readable tangible storage media of claim 13, wherein the instructions that, when executed by the processor, cause the processor to predict comprise instructions that cause the processor to:

store in a cache header fields of packets received over time; and predict one or more header fields by using as a key to the cache one or more received header fields to retrieve one or more other header fields for packets that had the highest number of occurrences in the cache.

17. The computer readable tangible storage media of claim 13, wherein the instructions that, when executed by the processor, cause the processor to predict comprise instructions that cause the processor to predict one or more of: Layer 3 headers, Layer 4 headers, and Deep Packet Inspection headers, based on one or more of: received Layer 2 headers, received Layer 3 headers, predicted Layer 3 headers, received Layer 4 headers, and predicted Layer 4 headers.

* * * * *